July 24, 1934.    R. S. KENT    1,967,310
SUGAR SOLUTION CLARIFIER APPARATUS
Filed Jan. 7, 1931    2 Sheets-Sheet 1
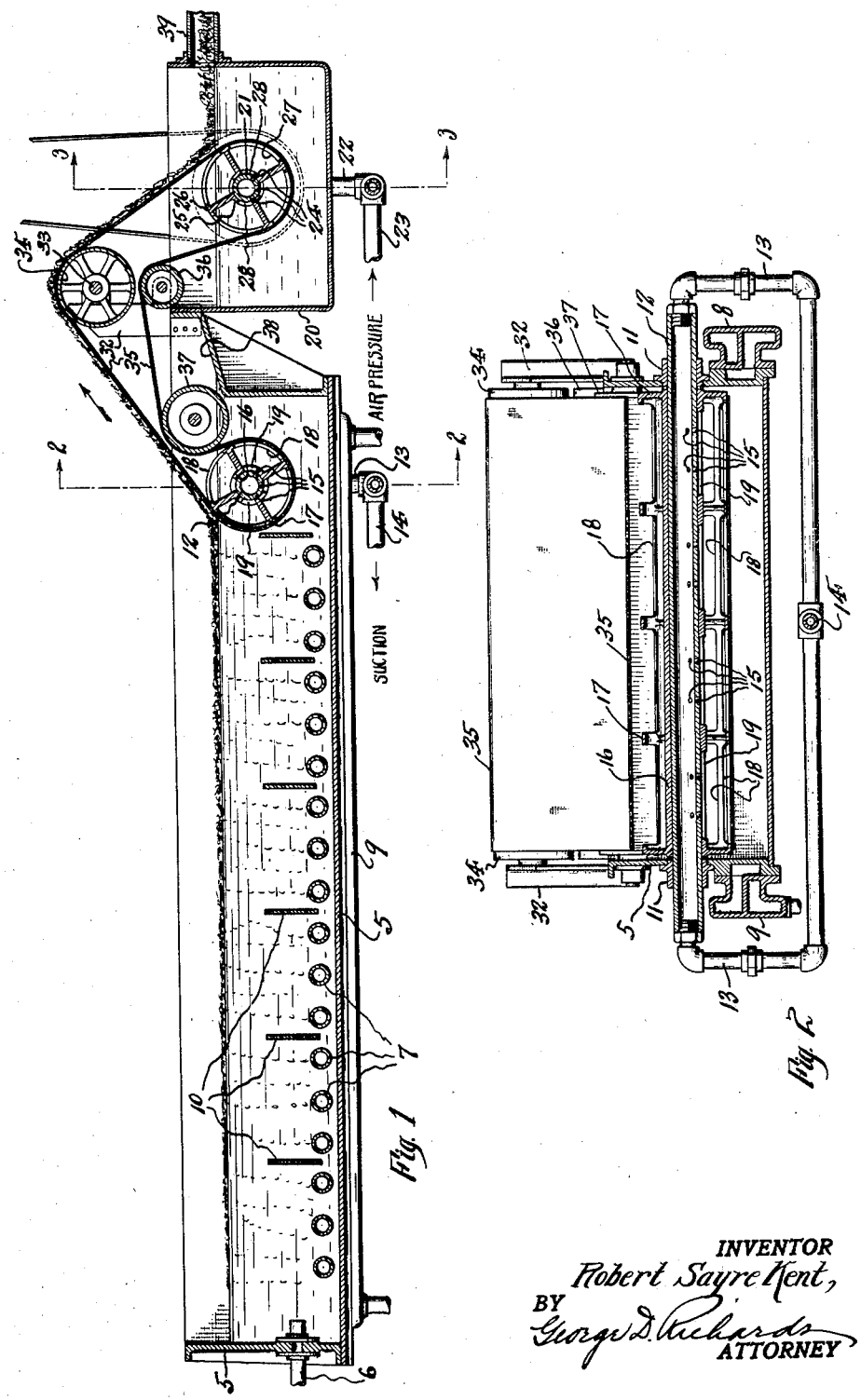
INVENTOR
Robert Sayre Kent,
BY
George D. Richards
ATTORNEY July 24, 1934.  R. S. KENT  1,967,310
SUGAR SOLUTION CLARIFIER APPARATUS
Filed Jan. 7, 1931  2 Sheets-Sheet 2
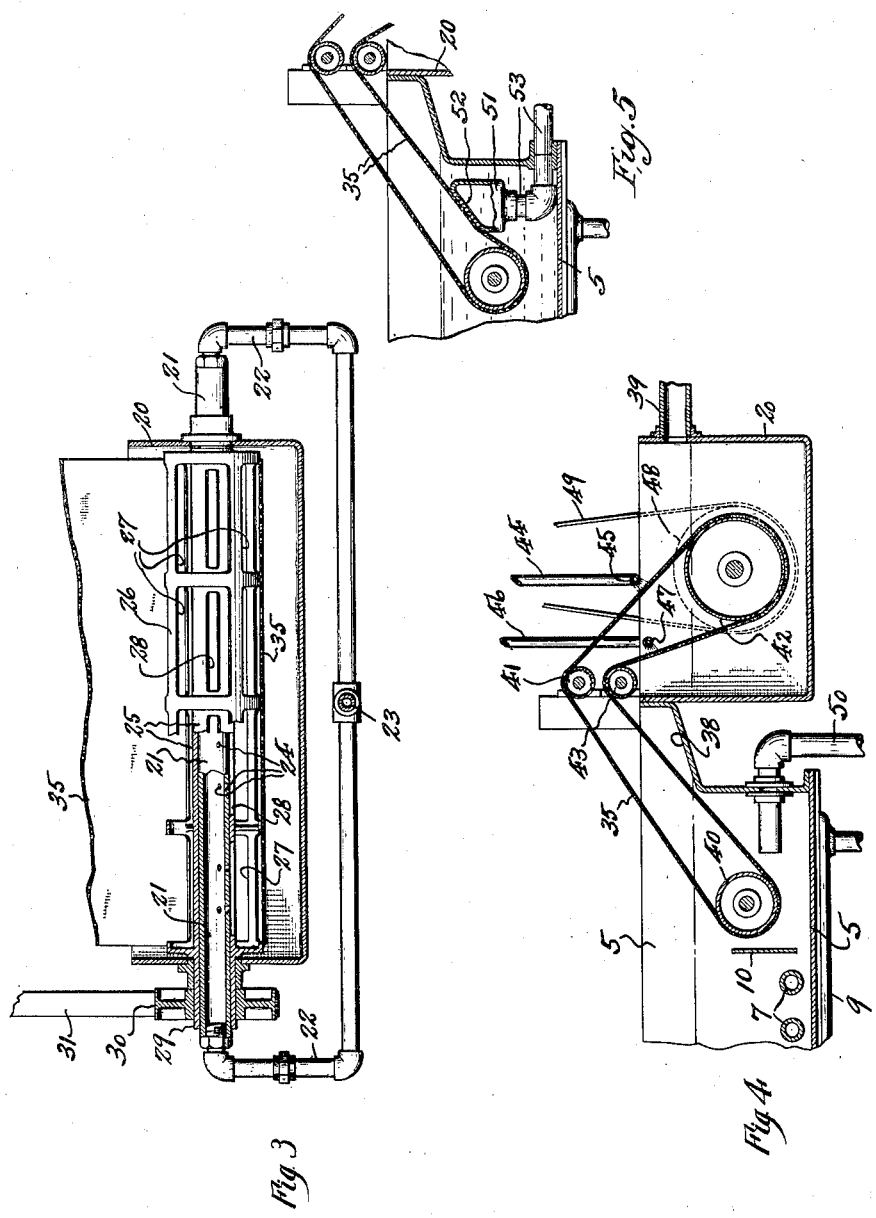
INVENTOR
Robert Sayre Kent,
BY
George D. Richards
ATTORNEY Patented July 24, 1934

1,967,310

UNITED STATES PATENT OFFICE 1,967,310

SUGAR SOLUTION CLARIFIER APPARATUS

Robert Sayre Kent, Brooklyn, N. Y.

Application January 7, 1931, Serial No. 507,145

3 Claims. (Cl. 210—197)

This invention relates to improvements in clarifier tanks for the defecation of sugar solutions.

A known process for the defecation of sugar solutions is characterized by the treatment of such solution with lime, phosphoric acid, heat and air. By such process the sugar solution, while cold, is first treated with phosphoric acid and neutralized with lime, and thereupon thoroughly impregnated with air. The sugar solution thus initially prepared is thereupon delivered into a clarifier tank, in which the solution is subjected to heat. The applied heat coagulates the albumen and organic acids, thereby forming a flocculent precipitate. The precipitate thus formed is entrained with the air rising through the solution, and is thus borne upward to the surface of the solution in the tank, forming a scum on said surface and leaving a clear solution in the lower levels of the tank which may be suitably drained from the latter, either continuously or intermittently. The scum is usually floated out of the tank through an overflow or spillway located close to the normal level of the solution in the tank. Such method of discharging the scum has the disadvantage of carrying off therewith an appreciable percentage of the sugar solution. The solution thus escaping may contain from one to three per cent of sugar, which must be separated from the scum and again passed through the clarifier tank, thus entailing additional work and loss of time. For example, assuming that five hundred thousand pounds of sugar is processed per day, the sugar necessary to be worked over will amount to from five thousand to fifteen thousand pounds.

It is the object of the present invention to provide an improved construction of clarifier tank having a novel means for separating the scum from the sugar solution, and then discharging such scum out of the clarifier tank, all in such manner that escape of the clear or defecated sugar solution with the discharged scum is reduced to a negligible minimum.

With the above general object of this invention in view, the same relates mainly to the provision of a novel construction of mechanical scum separating and conveyor means in connection with the discharge end of a clarifier tank.

The invention has for a further object to provide a novel means in conjunction with the scum separating and discharging means for also discharging the defecated sugar solution; and the invention has for another object to provide means to cleanse the scum conveyor means prior to its reentry into the clarifier tank.

Other objects of this invention, not at this time more particularly enumerated, will be understood from the following detailed description of the same.

Illustrative embodiments of the invention are shown in the accompanying drawings, in which:—

Fig. 1 is a longitudinal section of a clarifier tank equipped with one form of the novel scum separating and discharging means, and also showing in connection therewith both a novel means for discharging the defecated solution from the clarifier tank and means to cleanse the scum conveyor; Fig. 2 is a transverse vertical section, taken on line 2—2 in Fig. 1; and Fig. 3 is a transverse vertical section, taken on line 3—3 in Fig. 1.

Fig. 4 is a fragmentary longitudinal vertical section showing a somewhat simplified form of scum separating and discharging mechanism.

Fig. 5 is a fragmentary longitudinal section showing a modified suction means cooperative with the conveyor apron, through which clarified solution may be withdrawn from the tank.

Similar characters of reference are employed in the above described views, to indicate corresponding parts.

Referring to Figs. 1 to 3 inclusive of the drawings, the reference character 5 indicates a clarifier tank having at one end an intake pipe 6 through which the sugar solution to be defecated is introduced thereinto. Extending through the tank 5, preferably from side to side and adjacent to the bottom thereof, are a plurality of steam pipes 7. The steam pipes 7 are connected between suitable headers 8 and 9 which are mounted along the opposite sides of the tank. Said headers are provided with steam delivering and discharging ducts or passages which may be suitably connected with a source of steam supply. Preferably a series of transverse baffles 10 are mounted in spaced longitudinal relation throughout the length of the tank interior, to prevent undue agitation of the solution in the tank.

Mounted in bushings 11, connected with the side walls of the tank 5, for transverse extension through the tank interior and adjacent to the discharge end thereof, is a cylindrical hollow discharge tube 12. This discharge tube 12 is disposed in a plane below the normal level of solution supplied to the tank. Connected in communication with the exteriorly projecting ends of said discharge tube 12 are branch arms 13 of a suction pipe line 14. Provided in the underside walls of said discharge tube 12, so as to be directed toward the bottom of the tank 5, are circumferentially spaced rows of outlet ports 15.

Mounted on said discharge tube 12, so as to freely rotate thereon, is the hub sleeve 16 of a scum conveyer roll 17, the circumferential surface of which is pierced by a plurality of openings 18; the roll thus being of a skeleton type. The hub sleeve 16 is provided with circumferentially spaced rows of discharge valve ports 19, corresponding to the rows of outlet ports 15, and adapted to be carried across the latter when the roll 17 rotates.

Disposed adjacent to the discharge end of said clarifier tank 5 is a scum receiving tank 20. Mounted in connection with said scum tank 20, for transverse extension through the tank interior, is a cylindrical hollow air delivery tube 21, which is submerged below the surface of a body of water with which the scum tank is supplied. Connected in communication with the exteriorly projecting ends of said air delivery tube 21 are branch arms 22 of an air supply pipe line 23. Provided in the underside walls of said air delivery tube 21, so as to be directed toward the bottom of the scum tank 20, are circumferentially spaced rows of air discharge ports 24.

Mounted on said air delivery tube 21, so as to freely rotate thereon, is the hub sleeve 25 of a scum conveyer roll 26, the circumferential surface of which is pierced by a plurality of openings 27; the roll thus being of a skeleton type. The hub sleeve 25 is provided with circumferentially spaced rows of outlet valve ports 28, corresponding to the rows of discharge ports 24, and adapted to be carried across the latter when the roll 26 rotates. The hub sleeve 25 of said roll 26 is provided with an exteriorly projecting portion 29, upon which is mounted a pulley 30, over which runs a driving belt 31, driven from any suitable source of power, all whereby the roll 26 is power driven to in turn operate the scum separator and conveyer means hereafter described.

Journaled in bearing standards 32 is the shaft 33 of a transverse idler roll 34, which is disposed substantially intermediate the clarifier tank 5 and the scum tank 20, and above the tops thereof. An endless conveyer apron 35 runs over the conveyer roll 17, thence in upward inclination out of the clarifier tank 5 and over said idler roll 34, and thence in downward inclination into the scum tank 20 and over the conveyer roll 26. The return course of said conveyer apron 35 is carried upwardly out of the scum tank 20 over an idler roller 36 (the shaft of which is also journaled in said bearing standards 32), thence passing into said clarifier tank 5 and over a second idler roller 37, which is journaled in and extends transversely between the side walls of said clarifier tank 5, thence extending downwardly into the solution contained in said clarifier tank, so as to pass around the conveyer roll 17. Underlying the return course of said conveyer apron 35 is a drip pan extension 38 of the clarifier tank 5, the same having a downwardly sloping bottom extending toward the interior of the latter.

While it has been pointed out that the roll 26 is power driven, whereby operative motion is transmitted to the conveyer apron 35, such arrangement is but illustrative of one of many possible variations in the application of driving power to the conveyer apron 35 and to the rolls 17 and 26; and, consequently, the invention is not to be understood as limited to such or any other specific method or means of applying operating power to the scum separating and discharging mechanism of which said apron is an essential part.

The apron 35 is made of a suitable pervious material, such, e. g. as a woven textile fabric.

In the operation of the apparatus, the sugar solution, which has previously been treated with lime and phosphoric acid and thereupon impregnated with air, is flown into the clarifier tank 5 through the intake pipe 6. The sugar solution thus introduced into the clarifier tank 5 fills the same to such level that the conveyer roll 17 is substantially submerged in the solution. Heat is applied to the solution within the tank 5 by the steam pipes 7. The heat thus applied, coagulates the albumen and organic acids contained in the solution, thereby forming a flocculent precipitate. This precipitate becomes entrained within the air which is driven upwardly and outwardly from the solution, as the air is expanded by the applied heat. The precipitate is therefore buoyed up by the air, and carried to the surface of the solution within the tank. The precipitate thus carried to the surface of the solution forms a scum thereon, which floats toward the discharge end of the tank, the same accumulating in thickness towards said discharge end. Power being applied to the scum separating and discharging mechanism, the apron 35 thereof is caused to move in the direction of the arrow shown in Fig. 1. Said apron 35, as it is moved around the roll 17, emerges from the surface of the solution beneath the scum and thus operates to separate and pick up the scum from said surface. The apron moves upwardly on its outgoing course over the idler roller 34, and thence downwardly over the roll 26 which is submerged in the water content of the scum tank 20. As the apron moves downwardly into the scum tank and to the roll 26, the scum borne thereby is caught on the surface of the water of said scum tank and is thus removed from the apron 35. The scum which collects upon the surface of the water in the scum tank may be floated out of the tank through the discharge outlet 39. Air under pressure is delivered to the air delivery tube 21, and, as the hub sleeve of the roll 26 revolves on said tube, the outlet valve ports 28 of said hub sleeve successively pass into and out of registration with the air discharge ports 24 of said tube 21, whereby air is discharged into the interior of the roll 26 to pass outwardly through the openings 27 thereof, so as to, in turn, pass through the pervious apron 35. The movement of the air through the pervious apron 35 tends to remove therefrom all particles of precipitate which may still cling thereto, and the liberated air will tend to bubble up through the water in the scum tank so as to carry said particles upwardly to the surface of the water to join the main body of the removed scum. It will thus appear that the return course of the apron 35, as it moves over the idler rollers 36 and 37 back into the clarifier tank 5, is clean and free from the scum.

Owing to the fact that the material of the apron 35 is of pervious character, the same acts as a filter screen while the return course thereof is passing downwardly into the solution and over the roller 17. The pipe 14 being connected with a suitable suction pump will tend to draw the defecated sugar solution through the return course of the apron 35, with filtering effect, into the interior of the roll 17, and thence through the successively registering discharge valve ports 19 and outlet ports 15, as the same are opened by the rotation of the roll 17, and thence into the interior of the discharge tube 12, whereby the clarified or defecated solution is withdrawn from the interior of the tank through said pipe line 14.

It will be obvious that the above described operations may be carried on in a continuous manner by regulating the inflow of sugar solution into the tank 5 so that it corresponds to the discharge thereof through the pipe line 14, and consequently, as the albumen and organic acid content of the incoming solution is precipitated, the continuous production of scum occurs at the surface level of the solution passing through said tank. The scum will, due to the slow movement of the solution from the intake toward the outlet end of the clarifier tank, be constantly floated toward the scum separating and discharging apparatus, and the latter will, therefore, continuously operate to separate the scum from the surface of the solution, and then carry the same out of the clarifier tank 5 and over into the scum receiving tank 20. By the time the scum carrying course of the apron 35 reaches the upper idler roll 34, substantially all the sugar solution which may be carried up therewith will have dripped back into the tank by way of the drip pan section. It will thus be obvious that discharge of sugar solution from the clarifier tank with the separated and discharged scum is reduced to a negligible minimum, and consequently waste of sugar liquor is eliminated, and necessity for separating sugar liquor from discharged scum and reworking such liquor is largely avoided.

Referring now to Fig. 4 of the drawings, there is shown therein a somewhat simplified form and arrangement of scum separating and discharging means. In this modified arrangement, the sugar liquor discharging roll 17 is eliminated, and the air venting roll in the scum tank is likewise eliminated. In place of such more complicated structures an ordinary conveyer roller 40 is provided within and adjacent to the discharge end of the clarifier tank 5, so as to be submerged beneath the level of the sugar solution supplied thereto. Over this conveyer roller 40 is run the conveyer apron 35, so that the outgoing course thereof extends upwardly and outwardly over an idler roller 41, and thence downwardly into the scum tank 20 over the submerged ordinary conveyer roller 42 within the latter; the return course of the apron 35 passing out of the scum tank 20 over a second idler roller 43, and thence downwardly into the clarifier tank 5 for return around the conveyer roller 40. In order to aid in the removal of scum from the apron 35 as it moves into the scum tank 20, a water supply pipe 44 is provided, the same having a perforate section 45 through which water may be sprayed upon the scum carrying course of the apron, to aid in washing the scum therefrom and on to the surface of the water in the scum tank. In order to cleanse the return course of the apron 35, as it emerges from the scum tank, another water supply pipe 46 having a spray section 47 is provided, whereby said return course is thoroughly sprayed and cleansed with water before it returns into the clarifier tank 5. The conveyer apron may be driven by applying power to the conveyer roll 42 through a pulley 40 and belt 49; or any other suitably constructed and arranged power transmission means may be employed. When the scum separating and discharging means is of the modified form just above described, the defecated sugar solution may be discharged from the clarifier tank through any suitable form of outlet or drain pipe, as 50.

Referring to Fig. 5 of the drawings, I have shown therein, in combination with the pervious scum separating and discharging apron, a modified arrangement of means for withdrawing clarified solution utilizing the clean return course of said apron as a filtering member. In this modified arrangement, I provide within the discharge end of the clarifier tank 5 a suction-box 51 having a perforate top 52 over which the return course of the apron 35 runs. This suction-box 51 extends transversely beneath the apron, and is substantially coextensive with the width thereof. Connected with said suction-box 51 is a discharge pipe or conduit 53 which projects exteriorly from the clarifier tank 5, so as to be connected with suction-pump means (not shown) for drawing off the clear solution from the clarifier tank through said suction-box. The clean return course of the apron 35, as it travels over the perforate top of said suction-box 51 serves as a filter screen to hold back any particles of precipitate tending to pass out with the clarified solution from the tank.

As many changes could be made in the above described constructions, and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A clarifier tank having a scum separating and discharging means, comprising a pervious conveyer apron having its outgoing course arranged to rise angularly out of the solution in said clarifier tank so as to separate and lift scum from the surface of said solution and thence carry the same out of said tank, a skeleton roll submerged in the substantially clear solution in the discharge end of said tank over which the return course of said apron runs, a discharge tube extending between walls of said tank upon which said roll is rotatably mounted, said tube having ports communicating with the interior thereof, said roll having a hub-sleeve rotatable on said tube and provided with ports to communicate with said tube ports on rotation of said roll, and suction discharge piping connected with said tube whereby clarified solution is drawn from below the surface scum and out of said tank through the return course of said apron and thence through said skeleton roll and ports for discharge through said tube and piping.

2. In apparatus of the kind described, a clarifier tank, a scum tank adjacent to said clarifier tank, an endless conveyer apron extending between said clarifier tank and said scum tank, the scum carrying course of said apron being arranged to rise angularly out of the solution in said clarifier tank so as to separate and lift scum from the surface of said solution and thence carry the same over into said scum tank, a skeleton roll submerged in the solution in said clarifier tank over which the return course of said apron runs, a discharge tube extending between walls of said clarifier tank upon which said roll is rotatably mounted, said tube having ports communicating with the interior thereof, said roll having a hub-sleeve rotatable on said tube and provided with ports to communicate with said tube ports on rotation of said roll, and suction discharge piping connected with said tube whereby clarified solution is drawn from said clarifier tank through the return course of said apron and skeleton roll and ports for discharge through said tube and piping.

3. In apparatus of the kind described, a clarifier tank, a scum tank adjacent to said clarifier tank, an endless pervious conveyer apron extending between said clarifier tank and said scum tank, the scum carrying course of said apron being arranged to rise angularly out of the solution in said clarifier tank so as to separate and lift scum from the surface of said solution and thence angularly descend below the level of water contained in said scum tank whereby the major portion of the carried scum is floated off from said apron upon the water in said scum tank, a skeleton roll submerged in the substantially clear solution in the discharge end of said clarifier tank over which the clean return course of said apron runs, a discharge tube extending between walls of said clarifier tank upon which said roll is rotatably mounted, said tube having ports communicating with the interior thereof, said roll having a hub sleeve rotatable on said tube and provided with ports to communicate with said tube ports on rotation of said roll, suction discharge piping connected with said tube whereby clarified solution is drawn from said clarifier tank through said clean return course of the apron and thence through said skeleton roll and ports for discharge through said tube and piping, a second skeleton roll submerged in water contained in said scum tank over which the return course of said apron runs, a delivery tube extending between walls of said scum tank upon which said second roll is rotatably mounted, said delivery tube having delivery ports, said second roll having a hub sleeve rotatable on said delivery tube and provided with ports to communicate with said delivery tube ports on rotation of said second roll, and air delivery piping connected with said delivery tube whereby air is supplied to said delivery tube for discharge therefrom and thence through said apron while submerged in cleansing water so that adhering scum particles are dislodged from said apron.

ROBERT SAYRE KENT.